Patented Mar. 7, 1939

2,149,506

UNITED STATES PATENT OFFICE 2,149,506

METHOD OF BLEACHING MINERALS

Albert H. Bump, Watertown, Mass., assignor, by mesne assignments, to Monsanto Chemical Company, a corporation of Delaware No Drawing. Application July 6, 1936, Serial No. 89,130

9 Claims. (Cl. 252—8)

This invention relates to the treatment of argillaceous materials such as clays including kaolin, barytes, feldspar, bauxite, etc., whereby color imparting impurities commonly associated therewith are dissolved, decomposed or otherwise removed, and a resulting product is obtained which is acceptable for use as a paper filler, pigment, etc.

The materials above enumerated are commonly associated with or contaminated by color imparting impurities which are generally of an iron or manganese specie. Although for many purposes, the clays containing these impurities are satisfactory, for other purposes such clays are unsatisfactory, and it is necessary to remove the coloring matter. To this end it has been proposed heretofore to contact an aqueous suspension of clay which has been charged with sulphur dioxide with zinc plates or grids. It has likewise been proposed to add pieces of platinum, iron or zinc to an aqueous suspension of clay and subsequently saturate the suspension with sulphur dioxide. While these procedures improve the color of the clay, they have had no commercial importance because of the cost of the large quantities of bleaching agents required and the inferior quality of the product. Thus, for example, the clay so obtained is not suitable for use as a paper filler because of its inability to render the paper product resistant to the penetration of ink.

According to the present invention, I have provided a process for bleaching argillaceous materials that not only reduces greatly the quantities of reagent required, but affords a markedly improved product which is well suited for use in the manufacturing of paper.

One object of this invention is to provide a process for bleaching clays, barytes, bauxite, etc., which facilitates the conventional classifying and deflocculating operations, and at the same time makes possible a bleached clay product which, when incorporated in paper, imparts thereto the necessary resistance to ink penetration.

A further object of this invention is to afford a process by which vast deposits of clay and similar minerals that do not meet the exacting specifications as to color, etc., required for many purposes may be rendered marketable at a comparatively small cost.

I have found that one may obtain a markedly superior product and at the same time reduce the quantities of reagents required, if a clay slip or suspension is first treated with sulphur dioxide and then with zinc dust in an amount less than 2% by weight of the mineral. A preliminary reduction of foreign materials is thus effected by sulphur dioxide, and at the same time an increased dispersion of the clay particles is obtained. Sufficient sulphur dioxide remains in solution to combine with zinc powder which is added subsequently to the slip, whereby a rapid and substantially complete reduction and/or dissolution of the color imparting impurities is effected.

The zinc dust and the sulphur dioxide are found to react even in the highly dilute solutions employed to bleach clay slips to give zinc hydrosulphite ($ZnS_2O_4$) which is known to be a powerful reducing agent. Even in the presence of the clay, indigo disulphonic acid and similar indigoid dyes are immediately and completely reduced to colorless leuco forms. This constitutes a positive and conventional test for hydrosulphites. Other possible compounds of zinc and sulphur dioxide, such as zinc sulphite, zinc bisulphite or zinc thiosulphate, do not bleach indigo dyes unless employed in high concentration. The term zinc dust as herein employed denotes extremely finely divided zinc such as is obtained by vaporization and subsequent condensation of metallic zinc. The particles comprising this dust are usually less than three microns in diameter and may even be less than one micron. Particle size is of utmost importance in the process as is demonstrated by the patent to Feldenheimer 1,573,385, which shows that zinc filings and sulphur dioxide do not bleach clay in an aqueous slip even after several days standing.

The preliminary addition of the sulphur dioxide, as indicated, possesses some advantages. However, sulphur dioxide and zinc dust may be added simultaneously or the zinc dust may be added first and still produce a reasonable degree of bleaching. This is shown by the following examples.

A slight excess of sulphur dioxide is employed over that which would theoretically be required assuming one mol of zinc reacts with two mols of the sulphur dioxide.

According to the present invention a clay slip which previously has been subjected to the conventional classifying operations is treated with a predetermined quantity of sulphur dioxide gas. Thereafter a quantity of powdered zinc is added and uniformly distributed therethrough whereby the clay is rapidly bleached. The resulting product may be decanted, filtered and dried without further treatment.

Particularly in the case of off-color clays where relatively large amounts of zinc and $SO_2$ are required, it is sometimes desirable to wash the clay with clean water prior to drying to remove substantially completely the residual SO₂ and soluble zinc and iron salts and other dissolved impurities. This may be accomplished by the well known method of washing by decantation or by washing in the filter press. In order to improve the quality of the clay as a paper filler, particularly as regards the ink penetration test, and incidentally to improve the filtering and settling properties of the suspension, it is desirable to expel or neutralize the dissolved sulphur dioxide as by the addition to the slip of sufficient soda ash to produce a pH value of 6 or 7.

In cases where both washing and neutralization of the bleached material are desirable it is obvious that to effect economy of the neutralizing agent the washing step should precede the neutralization. However, the reverse procedure may be employed with satisfactory results.

The clay is recovered from the neutralized aqueous medium by any well known procedure such as a decantation and filtration.

Under some conditions a red flake-like material may form on the surface of the clay slip during the reduction. This material is easily separated, however, by the conventional clay degritting operation, which for this purpose may follow the bleaching process.

The following examples will serve to illustrate the application of the principles of the present invention:

Example 1.—Bennington, Vermont, clay having a color reading of 230 as measured by the Ives tint photometer and which, preferably, has been classified, is made into a 10% slip and treated with sulphur dioxide in an amount equivalent to 1.28 parts sulphur dioxide for each 100 parts of dry clay. Thereafter 0.525 part of zinc dust for each 100 parts of clay is added to the slip and intimately mixed therewith. The major decolorizing action is rapid and is practically finished within a few (e. g. five) minutes, but decolorizing continues very slowly for about one half hour.

Stoichiometrically two mols of sulphur dioxide react with one mol of zinc to form the reducing agent, namely, zinc hydrosulfite. In practicing this invention, I found it desirable to utilize approximately 30% excess of sulfur dioxide. The clay product so reduced is settled, decanted, filtered and dried in the usual manner. The color will be found to have been increased to 251.

Since sulphur dioxide in water forms a fairly strong mineral acid, and it will, of course, be apparent that upon its addition in the quantities indicated to the clay slip, a substantial degree of acidity will be produced. By actual test a pH value of approximately 2 to 2.1 was obtained in the slip prior to the addition of zinc. At the conclusion of the bleaching operation the pH value was about 3.4 or 3.5. This acidity seems to assist the bleaching operation. Probably the pH should not exceed approximately 5 or 5.5 for best results.

Example 2.—A Bennington clay having a color reading of 223 is treated in the manner described in the previous example with 1.46% sulphur dioxide and .6% of pulverized zinc. The products so obtained will be found to have a color reading of 249.

Example 3.—A good grade of Southern clay such as is mined in South Carolina or Georgia, and having a color reading of 254, when treated in the manner described above, using various amounts of zinc and sulphur dioxide gives the following results. The percentages stated are based on the weight of clay present.

| Sulphur dioxide | Zinc | Color reading |
|---|---|---|
| Per cent | Per cent | |
| .254 | .1 | 264 |
| .762 | .3 | 258 |
| 1.061 | .4 | 261 |

It is to be noted from these results that a large excess of zinc should be avoided both because of cost as well as inferiority of the final product. The preliminary addition of the sulphur dioxide, as indicated, possesses some advantages. However, sulphur dioxide and zinc dust may be added simultaneously, or the zinc dust may be added first, and still produce a reasonable degree of bleaching. This is shown by the following examples:

Example 4.—Clay slips are made up as described in the foregoing examples. Zinc dust is then added in the proportions indicated in the Examples 1, 2 and 3, and sulphur dioxide in a ratio slightly greater than two mols to one of zinc is added with agitation. The clay is then washed, neutralized and dried; rapid bleaching takes place upon addition of the sulphur dioxide.

Example 5.—The clay slips described in Examples 1 to 3 are treated simultaneously with zinc dust and sulphur dioxide in the proportions indicated. Best results are obtained if the slip containing the sulphur dioxide and zinc dust is thoroughly agitated until complete mixture is obtained. Good bleaching results.

An excess of sulphur dioxide over stoichiometric proportions is desirable, but is not in all cases absolutely necessary. The ratio has been varied from 65 to 260% of the amount required theoretically to combine with the zinc. In each case the slips were found to bleach indigo disulphonic acid to leuco form, thereby indicating that active zinc hydrosulphite was formed by the zinc dust and the sulphur dioxide. If desired, the acidity of the clay produced by the addition of sulphur dioxide may be increased by incorporation of such acid as sulphuric acid. The proportions of water may be varied over a wide range. For example, the 10% slips may be diluted to five times their original volume while the proportions of sulphur dioxide and zinc given in the examples are retained, and zinc hydrosulphite in active state will still be produced as shown by the indigo test.

Example 6.—When the clay is to be employed as a filler in the manufacture of paper, markedly superior properties are imparted to the clay, particularly as regards the ink penetration test, by treating the clay slip after the reduction with sufficient quantity of a base such as soda ash, silicate of soda, caustic soda or other analogous bases to neutralize the acid present. A resultant solution having a pH value of approximately 7 has been found to give satisfactory results. The importance of this step of neutralizing the clay is shown by the fact that a clay treated with zinc dust and excess sulphur dioxide and then neutralized in accordance with the present invention when incorporated as a filler into rosin sized writing paper gives a product which in the standard ink penetration test resists penetration for a period of from 5 to 20 minutes. Paper identically prepared and tested and containing the same filler, except for omission of the step of neutralizing, is penetrated in 10 seconds or less. Such paper is little more than a blotting paper and is worthless for writing purposes.

It is not uncommon to note the formation of a very small quantity of a red precipitate and red floating film during the reduction. This consists in part of hydrated oxide of iron, but the complete identity thereof is not definitely established. However, it is separated conveniently in the settling operation which precedes the filtration step whereby the red impurities are largely removed with the supernatant liquid which is pumped or siphoned away from the settled bleached clay. It is convenient and economical under these circumstances to effect the bleaching operation prior to the degritting operation. In other respects, one proceeds in a manner substantially as described above.

From the foregoing description, and particularly the examples set forth hereinabove, it will be apparent that I have provided a method of bleaching minerals of the clay, barytes, et al. type by which the slip is treated in the course of the classifying and degritting operations to a bleaching operation under the ordinary temperature conditions and without recourse to complicated equipment. It will likewise be apparent that the process employs substantially less of bleaching reagents than have been recommended heretofore, and that under the conditions of operation an excess of the bleaching reagents is avoided. Although the process has been described in detail and several examples have been set forth, it will be apparent that the specific quantities enumerated may be varied according to the quality and nature of the material to be bleached, and it will likewise be apparent that the stage at which the bleaching is effected may be varied without departing from the scope of this invention, which contemplates broadly the bleaching of slips of pulverulent minerals according to which the material is deflocculated and partially reduced by introducing a quantity of sulphur dioxide, after which the slip is treated with zinc dust, the quantity thereof not to exceed 2% by weight of the mineral present in the slip.

The present application is a continuation in part of my copending application Serial No. 553,896, filed July 29, 1931, which, like the present case, discloses methods of bleaching clay by means of zinc hydrosulphite.

What I claim is:

1. The method of bleaching minerals of the clay type which comprises deflocculating a mineral in an aqueous medium and effecting a preliminary reduction thereof by means of sulphur dioxide, and subsequently admixing pulverulent zinc with the aqueous mineral suspension containing sulphur dioxide and effecting bleaching.

2. The method of bleaching minerals of the clay type which comprises forming a slip of the mineral, effecting preliminary reduction by adding sulphur dioxide gas and subsequently dissolving a predetermined quantity of zinc in said sulphurated slip, the quantity of zinc being less than 2% of the weight of the mineral present in the slip but being in an amount sufficient to effect substantial bleaching, and effecting bleaching.

3. A method as defined in claim 2 and further characterized by the fact that the slip is subsequently neutralized by the addition of a base before the clay is separated from the slip and dried.

4. The method as defined in claim 2 and further characterized in that the pH of the slip is adjusted to approximately 7 after the bleaching operation.

5. The method of bleaching clay which comprises deflocculating the clay in an aqueous medium and effecting preliminary reduction thereof by means of sulfur dioxide and subsequently admixing pulverulent zinc with the aqueous suspension of clay containing sulfur dioxide, the molar ratio of sulfur dioxide to zinc being approximately 2 to 1 and effecting bleaching of the clay.

6. The method of bleaching clay by means of sulfur dioxide and zinc, characterized by the fact that the clay is formed into an aqueous slip and subjected to the action of sulfur dioxide to perform a preliminary reduction and subsequently adding zinc dust to complete the reduction, after which the clay is separated from the water containing dissolved matter.

7. A method of bleaching argillaceous minerals which comprises treating the mineral in the form of an aqueous slip in the presence of a mineral acid with a solution of zinc hydrosulfite formed by the reaction of finely-divided metallic zinc and sulfurous acid.

8. A method of bleaching argillaceous minerals which comprises treating the mineral in the form of an aqueous slip in the presence of a mineral acid with a solution of zinc hydrosulfite formed by the reaction of finely-divided metallic zinc and sulfurous acid and subsequently neutralizing the slip by means of a base.

9. A method of bleaching argillaceous minerals in accordance with claim 8 in which water-soluble salts are separated from the mineral after it has been treated with zinc hydrosulfite solution.

ALBERT H. BUMP.